(12) United States Patent
Song et al.

(10) Patent No.: US 12,346,155 B2
(45) Date of Patent: Jul. 1, 2025

(54) ELECTRONIC DEVICE INCLUDING HOUSING AND METHOD FOR MANUFACTURING THE SAME

(71) Applicant: Samsung Electronics Co., Ltd., Gyeonggi-do (KR)

(72) Inventors: Kyunghwan Song, Gyeonggi-do (KR); Goeun Kim, Gyeonggi-do (KR); Youngchun Kim, Gyeonggi-do (KR); Kidoc Son, Gyeonggi-do (KR); Hyuckki Lee, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 340 days.

(21) Appl. No.: 17/865,589

(22) Filed: Jul. 15, 2022

(65) Prior Publication Data

US 2023/0097742 A1 Mar. 30, 2023

Related U.S. Application Data

(63) Continuation of application No. PCT/KR2022/009018, filed on Jun. 24, 2022.

(30) Foreign Application Priority Data

Sep. 24, 2021 (KR) ........................ 10-2021-0126507

(51) Int. Cl.
*G06F 1/16* (2006.01)
*C23F 1/02* (2006.01)
(52) U.S. Cl.
CPC .............. *G06F 1/1626* (2013.01); *C23F 1/02* (2013.01)

(58) Field of Classification Search
CPC .... G06F 1/1626; G06F 1/1637; G06F 1/1656; C23F 1/02; C23F 1/16; C25D 11/06;
(Continued)

(56) References Cited

U.S. PATENT DOCUMENTS

2012/0194998 A1* 8/2012 McClure ................ H01Q 1/42
  361/679.56
2013/0052476 A1* 2/2013 Zhu .......................... B32B 1/00
  204/192.15

(Continued)

FOREIGN PATENT DOCUMENTS

CN 102480533 A 5/2012
CN 106637342 A 5/2017
(Continued)

OTHER PUBLICATIONS

International Search Report dated Oct. 6, 2022.
Extended European Search Report dated Sep. 20, 2024.
European Office Action dated May 19, 2025.

*Primary Examiner* — Quoc Thai N Vu
(74) *Attorney, Agent, or Firm* — Cha & Reiter, LLC

(57) ABSTRACT

According to an embodiment of the disclosure, a housing of an electronic device may include a first surface including a first portion having an irregularity formed thereon and a second portion spaced apart from the first portion and having an irregularity formed thereon. The irregularities formed on the first surface may be formed by etching. A maximum height of the irregularity formed on the first portion may be different from a maximum height of the irregularity formed on the second portion. The maximum height of irregularities formed on the first surface may gradually increase or decrease from the first portion to the second portion.

19 Claims, 13 Drawing Sheets

(58) Field of Classification Search
CPC .... C25D 11/24; C25D 11/243; H04M 1/0283;
H04M 1/03; H04M 1/0202; H05K
5/0018; H05K 5/04
See application file for complete search history.

(56) References Cited

U.S. PATENT DOCUMENTS

| | | |
|---|---|---|
| 2015/0103123 A1 | 4/2015 | Chen et al. |
| 2018/0054904 A1 | 2/2018 | Dejneka et al. |
| 2019/0037720 A1 | 1/2019 | Wilson et al. |
| 2019/0191598 A1 | 6/2019 | Naito et al. |
| 2019/0291504 A1 | 9/2019 | Cho et al. |
| 2020/0084885 A1* | 3/2020 | Wilson ................. H05K 5/0243 |
| 2020/0262743 A1* | 8/2020 | Kim ........................ H05K 5/03 |

FOREIGN PATENT DOCUMENTS

| | | |
|---|---|---|
| CN | 107396562 A | 11/2017 |
| CN | 109049349 A | 12/2018 |
| CN | 110740597 A | 1/2020 |
| CN | 111434808 A | 7/2020 |
| JP | 11-254898 A | 9/1999 |
| JP | 2009-291966 A | 12/2009 |
| JP | WO2018/038159 A1 | 3/2018 |
| KR | 10-2013-0019679 A | 2/2013 |
| KR | 10-2018-0019700 A | 2/2018 |
| KR | 10-2019-0015431 A | 2/2019 |
| KR | 10-2019-0039268 A | 4/2019 |
| KR | 10-2022-0022795 A | 2/2022 |

* cited by examiner

ELECTRONIC DEVICE INCLUDING HOUSING AND METHOD FOR MANUFACTURING THE SAME

CROSS-REFERENCE TO RELATED APPLICATION(S)

This application is a continuation of International Application No. PCT/KR2022/009018, which was filed on Jun. 24, 2022, and claims priority to Korean Patent Application No. 10-2021-0126507, filed on Sep. 24, 2021, in the Korean Intellectual Property Office, the disclosure of which are incorporated by reference herein their entirety.

BACKGROUND

Technical Field

One or more embodiments of the instant disclosure generally relate to an electronic device including a housing and a method for manufacturing the same.

Description of Related Art

With the development of information and communication technology and semiconductor technology, the distribution and use of various electronic devices is rapidly increasing. Recent electronic devices are portable and can be used for communication. Further, electronic devices may output stored information as sound or images. As these electronic devices have become highly integrated with various components, and high-speed, high-volume wireless communication becomes commonplace, electronic devices such as mobile communication terminal can now perform various functions. For example, one such electronic device can implement various functionalities, for example entertainment, such as playing video games, multimedia, such as replaying music/videos, communication and security function for mobile banking, and scheduling and e-wallet function. Such electronic devices become compact enough for users to conveniently carry. As users are commonly seen with these compact and slim electronic devices, e.g., smartphones, they increasingly demand improved exterior design for electronic devices.

Users' demand for improved exterior design has led to various methods for implementing various colors, shapes, or texture on the surface of the electronic devices. For example, for enhanced aesthetics, one electronic device may be provided with an ornamental effect on its outer surface by glossing or coloring the surface of the electronic device.

SUMMARY

Users' demand for improved exterior design has led to attempts to implement a plurality of visually divided areas on the surface of the electronic device. In general, it is possible to equally and simultaneously process the surface of the electronic device.

According to an embodiment of the disclosure, a housing of an electronic device may comprise a first surface including a first portion having an irregularity formed thereon and a second portion spaced apart from the first portion and having an irregularity formed thereon. The irregularities formed on the first surface may be formed by etching. A maximum height of the irregularity formed on the first portion may be different from a maximum height of the irregularity formed on the second portion. The maximum height of irregularities formed on the first surface may gradually increase or decrease from the first portion to the second portion.

According to an embodiment of the disclosure, a method for manufacturing a housing of an electronic device may comprise forming irregularities on a first portion and a second portion included in a first surface and etching the irregularities formed on the first portion and the second portion using an etching solution so that the irregularities have different maximum heights. The maximum height of the irregularities formed on the first surface may gradually increase or decrease from the first portion to the second portion.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Certain embodiments of the disclosure may provide an electronic device including a housing to which a visual ornamental effect is applied by forming a plurality of visually divided areas and/or a cover.

Certain embodiments of the disclosure may provide an electronic device having a plurality of visually divided areas formed on a curved surface and/or a cover glass.

According to certain embodiments of the disclosure, the housing of the electronic device may have various degrees of roughness and gloss formed on various surfaces, providing the user with an enhanced aesthetic feel.

Figure 1:
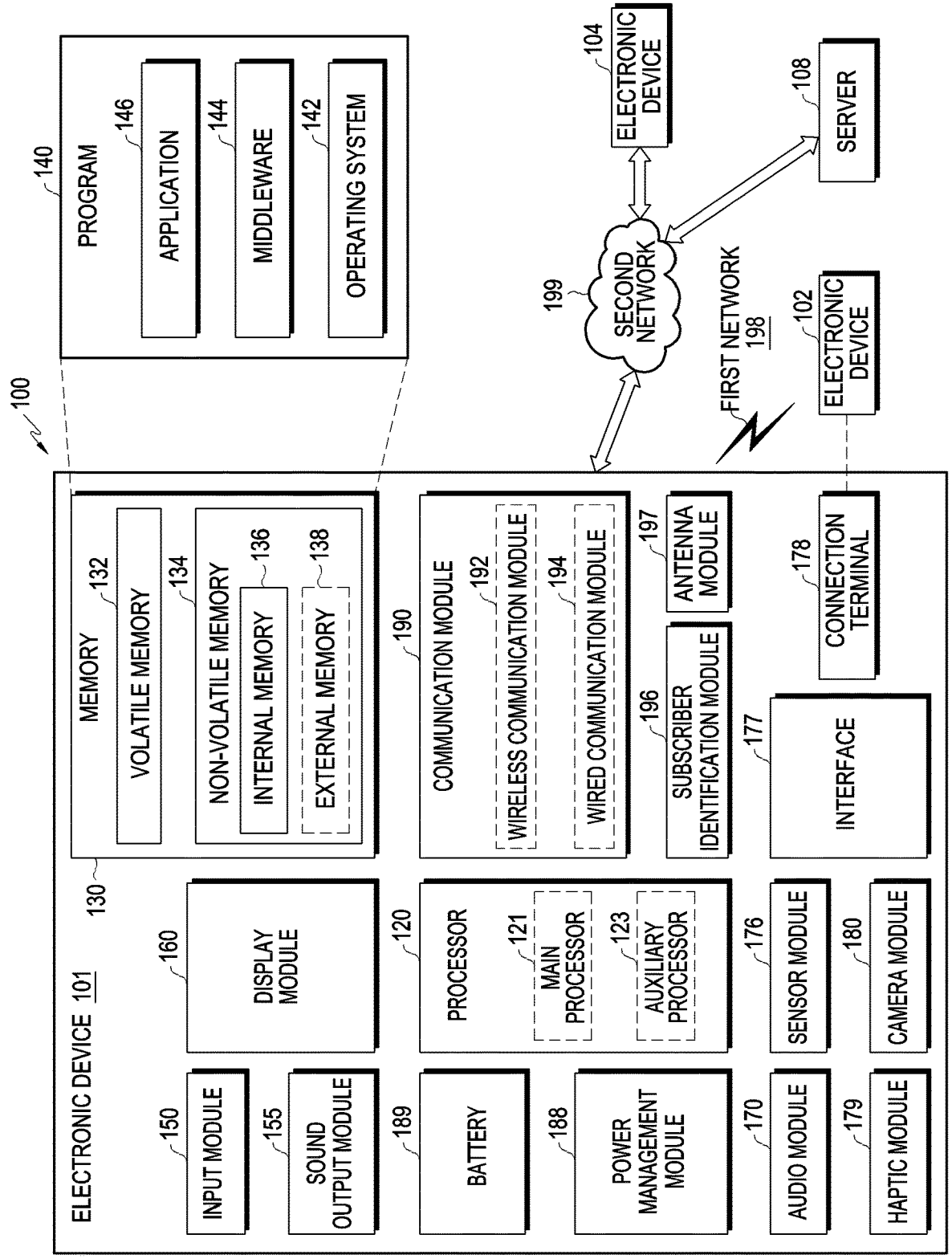
FIG. 1 is a block diagram illustrating an electronic device in a network environment according to an embodiment.

FIG. 1 is a block diagram illustrating an electronic device 101 in a network environment 100 according to an embodiment.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perfor7m various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
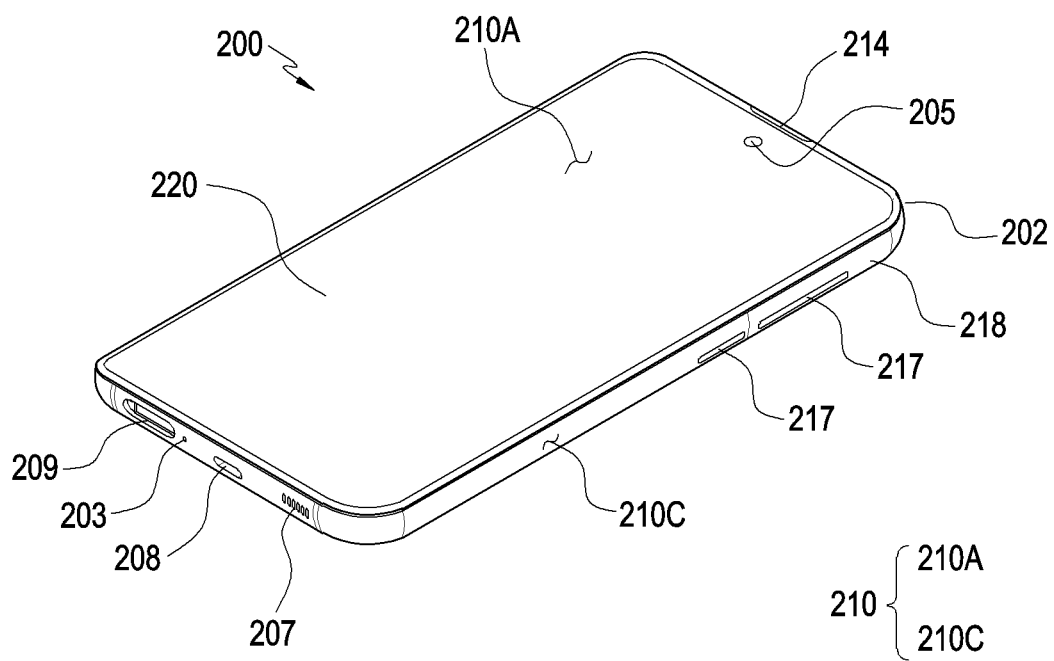
FIG. 2 is a front perspective view illustrating an electronic device according to an embodiment.
Figure 3:
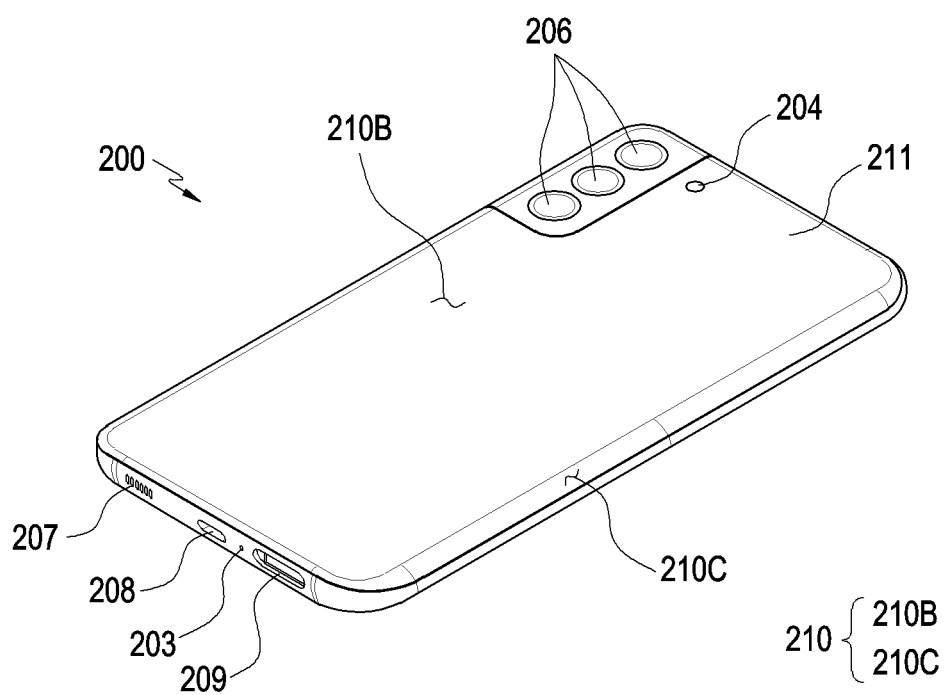
FIG. 3 is a rear perspective view illustrating an electronic device according to an embodiment.

FIG. 2 is a front perspective view illustrating an electronic device according to an embodiment of the disclosure; FIG. 3 is a rear perspective view illustrating an electronic device according to an embodiment of the disclosure;

Referring to FIGS. 2 and 3, according to an embodiment, an electronic device 200 may include a housing 210 with a front surface 210A, a rear surface 210B, and a side surface 210C surrounding a space between the front surface 210A and the rear surface 210B. According to another embodiment (not shown), the housing 210 may denote a structure forming part of the front surface 210A, the rear surface 210B, and the side surface 210C of FIG. 2. For example, the housing 210 may include a front plate 202 and a rear plate 211. According to an embodiment, at least part of the front surface 210A may have a substantially transparent front plate 202 (e.g., glass plate or polymer plate including various coat layers). The rear surface 210B may be formed by a rear plate 211. The rear plate 211 may be made of, e.g., glass, ceramic, polymer, metal (e.g., titanium (Ti), stainless steel (STS), aluminum (Al), or magnesium (Mg)), or a combination of at least two thereof. The side surface 210C may be formed by a side bezel structure (or "side member") 218 that couples to the front plate 202 and the rear plate 211 and includes metal and/or polymer. According to an embodiment, the rear plate 211 and the side bezel plate 218 may be integrated together and include the same material (e.g., glass, metal, such as aluminum, or ceramic). According to another embodiment, the front surface 210A and/or the front plate 202 may be referred to a part of the display 220.

According to an embodiment, the electronic device 200 may include at least one of a display 220, audio modules 203, 207, and 214 (e.g., the audio module 170 of FIG. 1), a sensor module (e.g., the sensor module of FIG. 1). 176), camera modules 205 and 206 (e.g., the camera module 180 of FIG. 1), a key input device 217 (e.g., the input module 150 of FIG. 1), and connector holes 208 and 209 (e.g., the connection terminal 178 of FIG. 1). According to an embodiment, the electronic device 200 may exclude at least one (e.g., the connector hole 209) of the components or may add other components. According to an embodiment, the display 220 may be visually exposed through, e.g., a majority portion of the front plate 202.

According to an embodiment, the surface (or the front plate 202) of the housing 210 may include a screen display area formed as the display 220 is visually exposed. For example, the screen display area may include the front surface 210A.

According to an embodiment, the electronic device 200 may include a recess or opening formed in a portion of the screen display area (e.g., the front surface 210A) of the display 220 and may include at least one or more of an audio module 214, a sensor module (not shown), a light emitting device (not shown), and a camera module 205 aligned with the recess or opening. According to another embodiment (not shown), at least one or more of the audio module 214, sensor module (not shown), camera module 205, fingerprint sensor (not shown), and light emitting device (not shown) may be included on the rear surface of the screen display area of the display 220.

According to an embodiment (not shown), the display 220 may be disposed to be coupled with, or adjacent, a touch detecting circuit, a pressure sensor capable of measuring the strength (pressure) of touches, and/or a digitizer for detecting a magnetic field-type stylus pen.

In some embodiments, at least a portion of the key input device 217 may be disposed on the side bezel structure 218.

According to an embodiment, the audio modules 203, 207, and 214 may include, e.g., a microphone hole 203 and speaker holes 207 and 214. A microphone for acquiring external sounds may be disposed in the microphone hole 203. In some embodiments, a plurality of microphones may be disposed to detect the direction of the sound. The speaker holes 207 and 214 may include an external speaker hole 207 and a phone receiver hole 214. According to an embodiment, the speaker holes 207 and 214 and the microphone hole 203 may be implemented as a single hole, or speakers may be included without the speaker holes 207 and 214 (e.g., piezo speakers).

According to an embodiment, the sensor modules (not shown) may generate an electrical signal or data value corresponding to an internal operating state or external environmental state of the electronic device 200. The sensor module (not shown) may include, e.g., a first sensor module (not shown) (e.g., proximity sensor) and/or a second sensor module (not shown) (e.g., fingerprint sensor) disposed on the front surface 210A of the housing 210. The sensor module (not shown) may include a third sensor module (not shown) (e.g., heart-rate monitor (HRM) sensor) and/or a fourth sensor module (not shown) (e.g., fingerprint sensor) disposed on the rear surface 210B of the housing 210). In an embodiment (not shown), the fingerprint sensor may be disposed on the rear surface 210B as well as on the front surface 210A (e.g., the display 220) of the housing 210. The electronic device 200 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor (not shown).

According to an embodiment, the camera modules 205 and 206 may include a front camera module 205 disposed on the first surface 210A of the electronic device 200 and a rear camera module 206 and/or a flash 204 disposed on the rear surface 210B. The camera modules 205 and 206 may include one or more lenses, an image sensor, and/or an image signal processor. The flash 204 may include, e.g., a light emitting diode (LED) or a xenon lamp. According to an embodiment, two or more lenses (infrared (IR) camera, wide-angle lens, and telescopic lens) and image sensors may be disposed on one surface of the electronic device 200.

According to an embodiment, the key input device 217 may be disposed on the side surface 210C of the housing 210. According to an embodiment, the electronic device 200 may exclude all or some of the above-mentioned key input devices 217 and the excluded key input devices 217 may be implemented in other forms, e.g., as soft keys, on the display 220.

According to an embodiment, the light emitting device (not shown) may be disposed on, e.g., the front surface 210A of the housing 210. The light emitting device (not shown)

may provide, e.g., information about the state of the electronic device 200 as flashes of light. According to another embodiment, the light emitting device (not shown) may provide a light source that interacts with, e.g., the front camera module 205. The light emitting device (not shown) may include, e.g., a light emitting diode (LED), an infrared (IR) LED, and/or a xenon lamp.

According to an embodiment, the connector holes 208 and 209 may include a first connector hole 208 for receiving a connector (e.g., earphone jack) for transmitting/receiving audio signals to/from an external electronic device or a connector (e.g., USB connector) for transmitting/receiving power and/or data to/from the external electronic device and/or a second connector hole 209 for receiving a storage device (e.g., subscriber identification module (SIM) card). According to an embodiment, the first connector hole 208 and/or the second connector hole 209 may be omitted.

Figure 4:
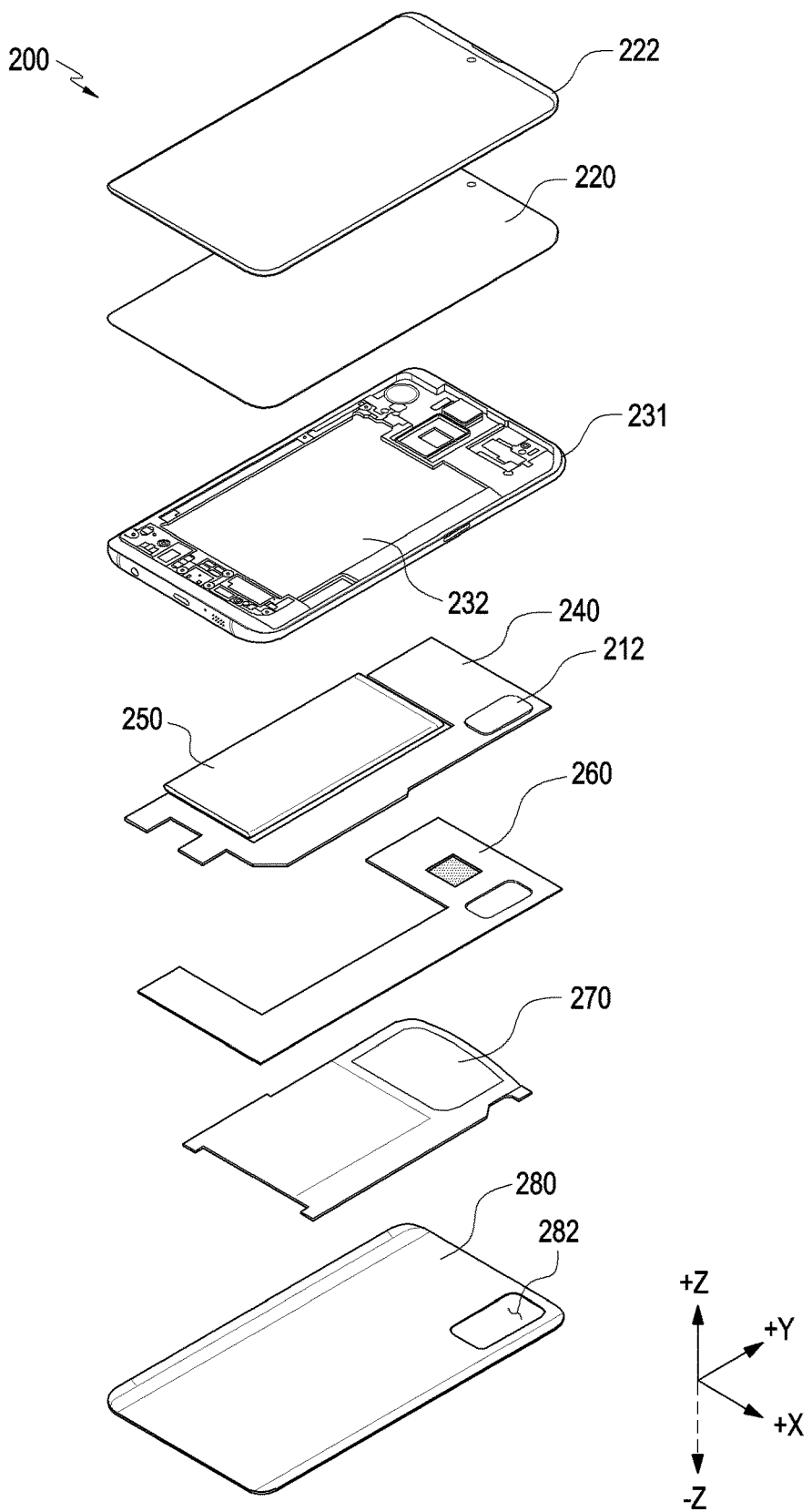
FIG. 4 is an exploded perspective view illustrating an electronic device according to an embodiment.

FIG. 4 is an exploded perspective view illustrating an electronic device according to an embodiment of the disclosure.

Referring to FIG. 4, an electronic device 200 (e.g., the electronic device 200 of FIGS. 2 and 3) may include at least one of a front plate 222 (e.g., the front plate 202 of FIG. 2), a display 220 (e.g., the display 220 of FIG. 2), a bracket 232 (e.g., front supporting member), a printed circuit board 240, a battery 250, a rear case 260 (e.g., rear supporting member), an antenna 270, and a rear plate 280 (e.g., the rear plate 211 of FIG. 3). According to an embodiment, the electronic device 200 may exclude at least one (e.g., the rear case 260) of the components or may add other components. At least one of the components of the electronic device 200 may be the same or similar to at least one of the components of the electronic device 200 of FIG. 2 or 3, and duplicative description is omitted below.

According to an embodiment, the bracket 232 may be disposed inside the electronic device 200 to be connected with the side bezel structure 231 or integrated with the side bezel structure 231. The bracket 232 may be made of, e.g., metal and/or non-metallic material (e.g., polymer). The bracket 232 may receive the display 220 on one surface and the printed circuit board 240 on the other surface. A processor (e.g., the processor 120 of FIG. 1), a memory (e.g., the memory 130 of FIG. 1), and/or an interface (e.g., the interface 177 of FIG. 1) may be mounted on the printed circuit board 240.

According to an embodiment, the battery 250 may be a device for supplying power to at least one component (e.g., the camera module 212) of the electronic device 200. The battery 250 may include, e.g., a primary cell which is not rechargeable, a secondary cell which is rechargeable, or a fuel cell. At least a portion of the battery 250 may be disposed on substantially the same plane as the printed circuit board 240. The battery 250 may be integrally or detachably disposed inside the electronic device 200.

According to an embodiment, the rear case 260 may be disposed between the printed circuit board 240 and the antenna 270. For example, the rear case 260 may include one surface to which at least one of the printed circuit board 240 and the battery 250 is coupled, and another surface to which the antenna 270 is coupled.

According to an embodiment, the antenna 270 may be disposed between the rear plate 280 and the battery 250. The antenna 270 may include, e.g., a near-field communication (NFC) antenna, a wireless charging antenna, and/or a magnetic secure transmission (MST) antenna. The antenna 270 may perform short-range communication with, e.g., an external device or may wirelessly transmit or receive power necessary for charging. For example, the antenna 270 may include a coil for wireless charging. According to an embodiment, an antenna structure may be formed by a portion or combination of the side bezel structure 231 and/or the bracket 232.

According to certain embodiments, the electronic device 200 may include a camera module 212 disposed in the second housing (e.g., the housing 210 of FIG. 2). According to an embodiment, the camera module 212 may be disposed on the bracket 232 and may be a rear camera module (e.g., the camera module 212 of FIG. 3) capable of obtaining an image of a subject positioned behind (e.g., in the −Z direction) of the electronic device 200. According to an embodiment, at least a portion of the camera module 212 may be exposed to the outside of the electronic device 200 through the opening 282 formed in the rear plate 280.

The electronic device 200 illustrated in FIGS. 2 to 4 has a bar-type or plate-type appearance but the disclosure is not limited thereto. For example, the illustrated electronic device may be a rollable electronic device or a foldable electronic device. The term "rollable electronic device" may refer to an electronic device having a display at least a portion of which may be wound or rolled or received in a housing (e.g., the housing 210 of FIG. 2) as the display (e.g., the display 220 of FIG. 4) is bent and deformed. As the display is unrolled or is exposed according to the user's need, the active area of the display may be increased. "Foldable electronic device" may refer to an electronic device that may be folded in one or more directions such that two different areas of the display face each other or are in directions opposite to each other. In general, while folded, the two different areas of the display face each other and, while unfolded and in use, the user may unfold the display so that the two different areas form a substantially flat shape. According to some embodiments of the disclosure, the electronic device 200 may be various electronic devices, such as a laptop computer or a home appliance, as well as a portable electronic device, such as a smart phone.

Figure 5:
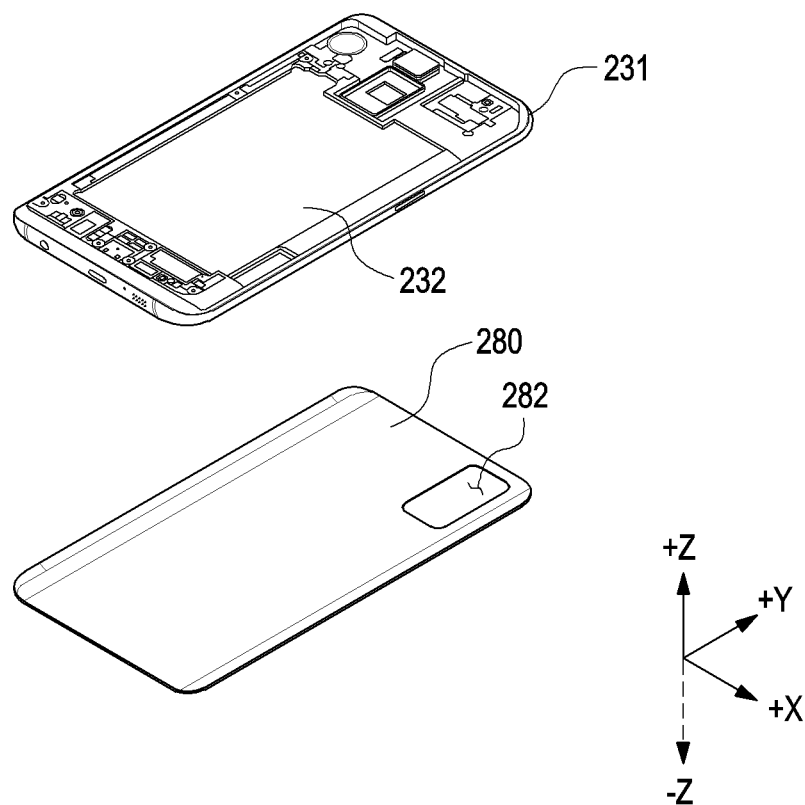
FIG. 5 is an exploded perspective view illustrating a side bezel structure and a rear plate according to an embodiment.

FIG. 5 is an exploded perspective view illustrating a side bezel structure and a rear plate according to an embodiment.

The side bezel structure 231 and the rear plate 280 illustrated in FIG. 5 may be the same as or similar to the side bezel structure 231 and the rear plate 280 illustrated in FIGS. 2 to 4. Accordingly, duplicative description thereof is omitted below.

Referring to FIG. 5, the rear plate 280 may include an inner surface facing inward (in the +Z direction) of the electronic device (e.g., the electronic device 200 of FIGS. 2 to 4) and an outer surface facing in the opposite direction (in the −Z direction) from the inner surface. The rear plate 280 may form at least a portion of the housing (e.g., the housing 210 of FIG. 2) which in turn is formed to surround at least a portion of the display (e.g., the display 220 of FIG. 2). The housing 210 may include a front plate (e.g., the front plate 222 of FIG. 4) facing in a first direction (e.g., in the +Z axis of FIG. 4), the rear plate 280 facing in a second direction (e.g., in the −Z direction of FIG. 4) opposite to the first direction, and the side bezel structure 231 connecting the front plate 222 with the rear plate 280. An opening 282 may be formed in the rear plate 280 to expose the camera module (e.g., the camera module 212 of FIG. 4) to the outside of the electronic device 200.

Figure 6:
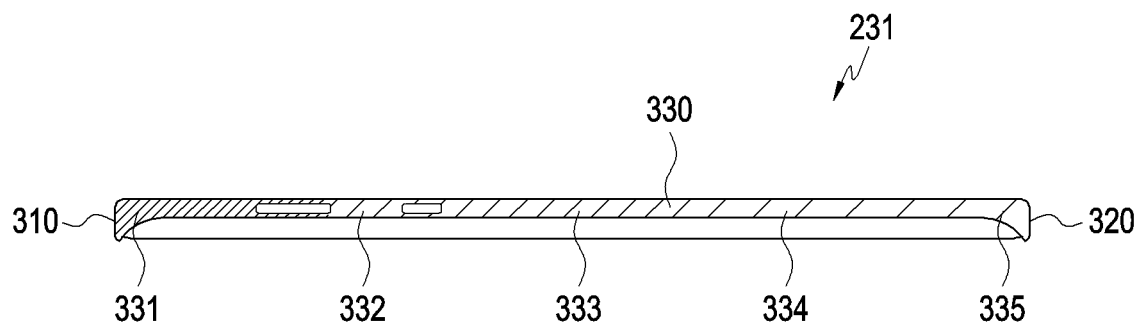
FIG. 6 is a side view illustrating a side bezel structure according to an embodiment.

FIG. 6 is a side view illustrating a side bezel structure according to an embodiment.

The side bezel structure 231 illustrated in FIG. 6 may be the same as or similar to the side bezel structure 231 illustrated in FIGS. 2 to 5. Accordingly, duplicative description thereof is omitted below.

Referring to FIG. 6, according to an embodiment, the side bezel structure 231 may include an upper surface 310, a lower surface 320, and a side surface 330. The side surface 330 may be disposed between the upper surface 310 and the lower surface 320.

According to an embodiment, the side surface 330 may be implemented by a plurality of side portions. According to an embodiment, the side surface 330 may be implemented by five side portions. For example, the side surface 330 may be implemented by a first side portion 331, a second side portion 332, a third side portion 333, a fourth side portion 334, and a fifth side portion 335.

According to an embodiment, the first side portion 331 may be a portion of the side surface 330 closest to the upper surface 310. The fifth side portion 335 may be a portion of the side surface 330 closest to the lower surface 320. The third side portion 333 may be a portion between the first side portion 331 and the fifth side portion 335. The second side portion 332 may mean a portion between the first side portion 331 and the third side portion 333. The fourth side portion 334 may mean a portion between the third side portion 333 and the fifth side portion 335. The division of the side surface 330 into five side portions is merely an example, and the side surface 330 of the disclosure is not limited to be divided into five side portions.

According to an embodiment, the intervals between the first side portion 331 to the fifth side portion 335 may be constant. According to an embodiment, the distance between the first side portion 331 and the second side portion 332, the distance between the second side portion 332 and the third side portion 333, the distance between the third side portion 333 and the fourth side portion 334 and the distance between the fourth side portion 334 and the fifth side portion 335 may be the same.

According to an embodiment, the degree of gloss of the first side portion 331 in the side surface 330 of the side bezel structure 231 may be low, and the degree of gloss of the fifth side portion 335 may be high. This is described below in detail with reference to FIGS. 7A and 7B.

Figure 7A:
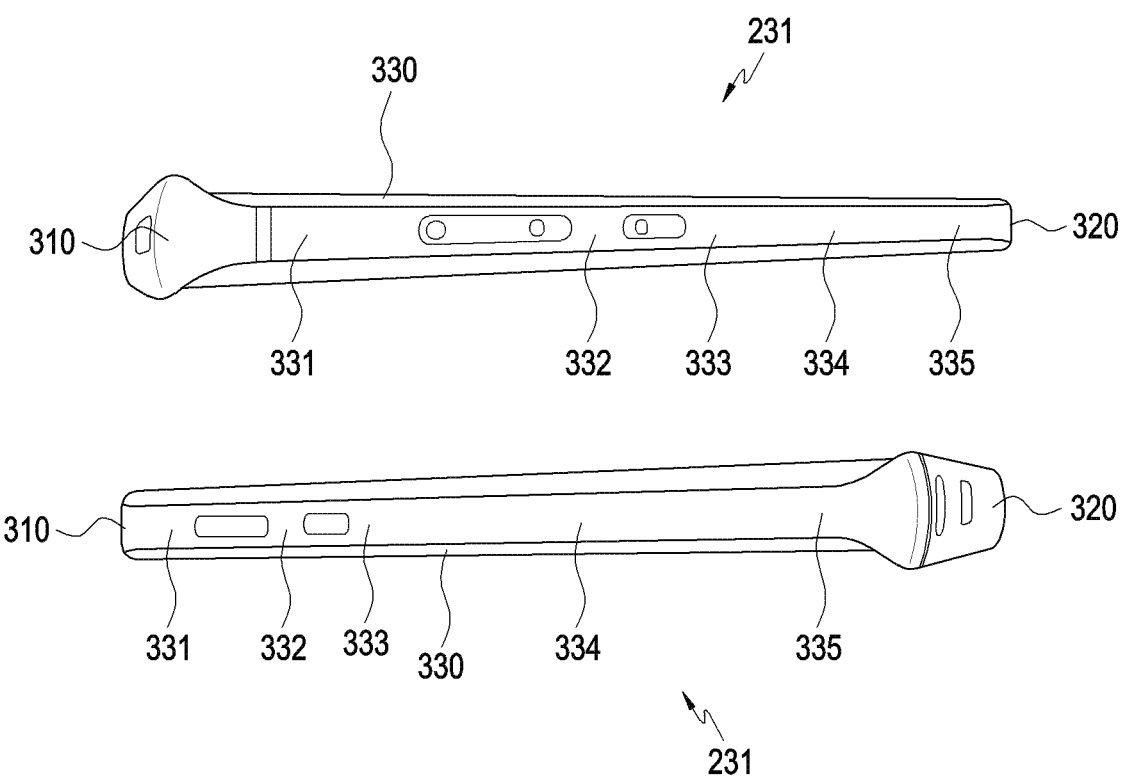
FIG. 7A is a view illustrating a side bezel structure having various gloss and textures as viewed at various angles according to an embodiment.
Figure 7B:
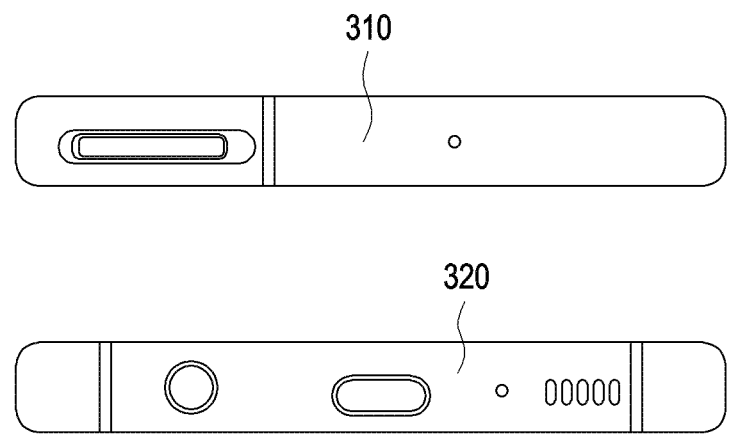
FIG. 7B is a view illustrating an upper surface and a lower surface having various gloss and textures.

FIG. 7A is a view illustrating a side bezel structure having various gloss and textures as viewed at various angles according to an embodiment, and FIG. 7B is a view illustrating an upper surface and a lower surface having various gloss and textures.

The upper surface 310, the lower surface 320, the first side portion 331, the second side portion 332, the third side portion 333, the fourth side portion 334, and the fifth side portion 335 illustrated in FIGS. 7A and 7B may be the same as or similar to the upper surface 310, the lower surface 320, the first side portion 331, the second side portion 332, the third side portion 333, the fourth side portion 334, and the fifth side portion 335 illustrated in FIG. 6. Accordingly, duplicative description thereof is omitted below.

Referring to FIG. 7A, the upper surface 310, the lower surface 320, and the side surface 330 are disclosed according to an embodiment.

According to an embodiment, the side surface 330 may have various textures and gloss. According to an embodiment, the surface of the side surface 330 may gradually become smoother in texture and glossier as it progresses from the upper surface 310 to the lower surface 320.

According to an embodiment, the texture of the surface of the first side portion 331 closest to the upper surface 310 may be rougher to a degree similar to the texture of the surface of the upper surface 310. According to an embodiment, the degree of gloss of the first side portion 331 may be similar to the degree of gloss of the upper surface 310.

According to an embodiment, the texture of the surface of the fifth side portion 335 closest to the lower surface 320 may be smoother to a degree similar to the texture of the surface of the lower surface 320. According to an embodiment, the degree of gloss of the fifth side portion 335 may be similar to the degree of gloss of the lower surface 320.

According to an embodiment, the texture of the surface of the third side portion 333 positioned between the first side portion 331 and the fifth side portion 335 may be of an intermediate smoothness between the smoothness of the surface of the first side portion 331 and the surface of the fifth side portion 335. According to an embodiment, the degree of gloss of the third side portion 333 may be of an intermediate gloss between the gloss of the first side portion 331 and the gloss of the fifth side portion 335.

According to an embodiment, the surface of the second side portion 332 positioned between the first side portion 331 and the third side portion 333 may be of an intermediate smoothness between the smoothness of the surface of the first side portion 331 and the surface of the third side portion 333. According to an embodiment, the degree of gloss of the second side portion 332 may be of an intermediate gloss between the gloss of the first side portion 331 and the gloss of the third side portion 333.

According to an embodiment, the surface of the fourth side portion 334 positioned between the third side portion 333 and the fifth side portion 335 may be of an intermediate smoothness between the smoothness of the surface of the third side portion 333 and the surface of the fifth side portion 335. According to an embodiment, the degree of gloss of the fourth side portion 334 may be of an intermediate gloss between the gloss of the third side portion 333 and the gloss of the fifth side portion 335.

Referring to FIG. 7B, according to an embodiment, the surface of the upper surface 310 has rough texture and a low degree of gloss. According to an embodiment, the surface of the lower surface 320 is smooth enough to have no texture, and has a high degree of gloss. As such, the upper surface 310 and the lower surface 320 may be expressed in different textures and degrees of gloss. According to another embodiment, the surface of the upper surface 310 may be smooth and has a high degree of gloss, and the surface of the lower surface 320 may be rough and has a low degree of gloss.

According to an embodiment, the surfaces of the upper surface 310 and the lower surface 320 may have various textures and degrees of gloss, and at least two side surfaces 330 may have different textures and degrees of gloss.

According to an embodiment, various textures and degrees of gloss may be expressed by the upper surface 310, the lower surface 320, and at least two side surfaces 330.

Figure 8:
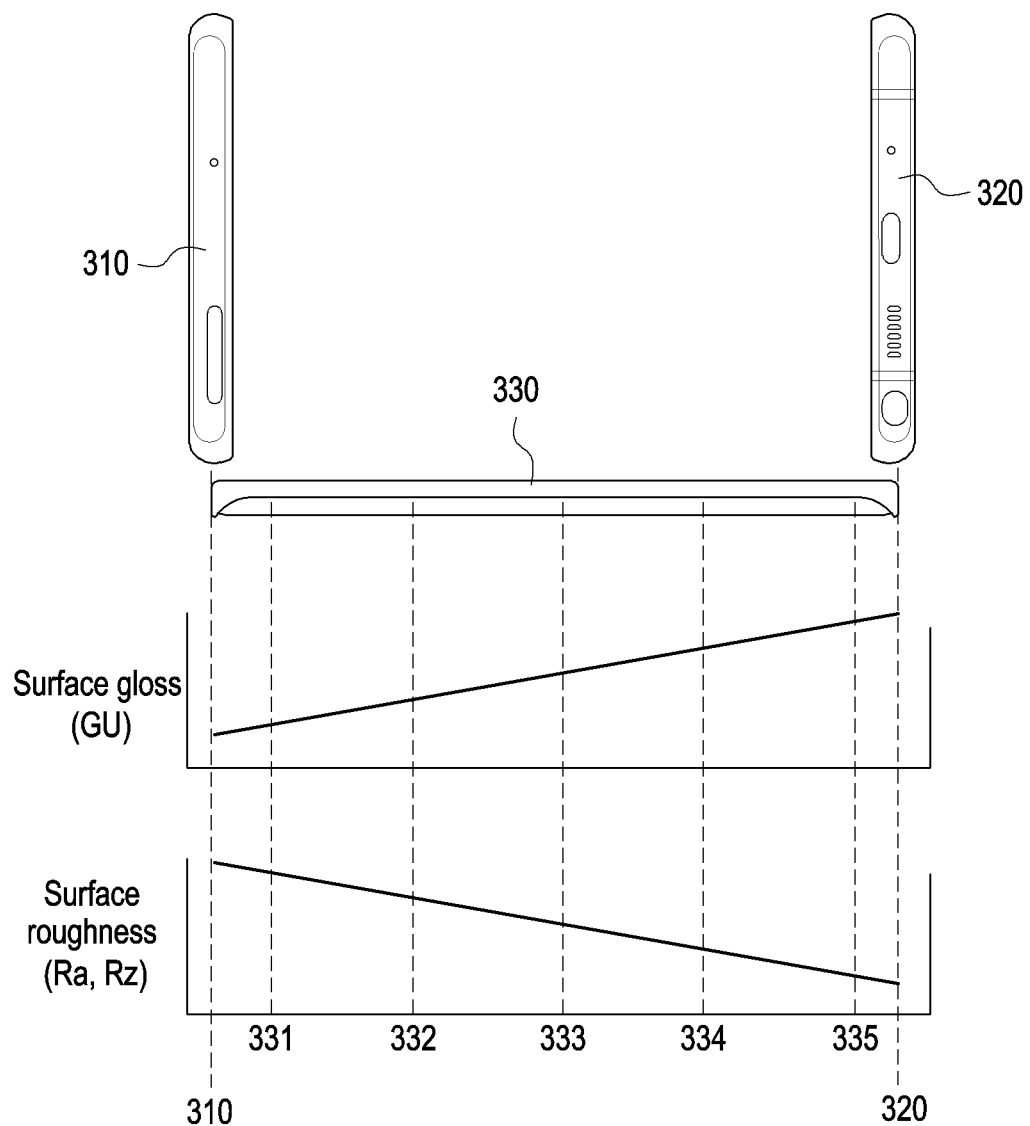
FIG. 8 is a view illustrating an upper surface 310, a lower surface 320, and a side surface 330 and graphs of the degree of surface gloss and surface roughness thereof according to an embodiment.

FIG. 8 is a view illustrating an upper surface 310, a lower surface 320, and a side surface 330 and graphs of the degrees of surface gloss and surface roughness of the upper surface 310, the lower surface 320, and the side surface 330 according to an embodiment.

The upper surface 310, the lower surface 320, and the side surface 330 illustrated in FIG. 8 may be the same as or similar to the upper surface 310, the lower surface 320, and the side surface 330 illustrated in FIGS. 6 to 7B. Accordingly, duplicative description thereof is omitted below.

Referring to FIG. 8, according to an embodiment, in the two graphs, the X axis may denote the position of a portion of the upper surface 310, the lower surface 320, and the side surface 330 from the upper surface 310 to the lower surface 320. The Y axis of one of the two graphs may denote the degree of gloss (gloss unit (GU)), and the Y axis of the other may denote the surface roughness (Ra, Rz). With respect to the surface roughness, Ra may refer to the 'arithmetic mean roughness,' and Rz may refer to the 'maximum height roughness.'

According to an embodiment, in the graph of degree of gloss, it may be identified that the degree of gloss of the upper surface 310 is low, and the degree of gloss of the lower surface 320 is high. It may be identified that the degrees of gloss of the first side portion 331 to the fifth side portion 335 of the side surface 330 linearly (gradually) vary (increase) from the first side portion 331 to the fifth side portion 335. The value for the degree of gloss is described below with reference to FIG. 9.

According to an embodiment, it may be identified that in the graph of surface roughness, the roughness value of the upper surface 310 is high, and the roughness value of the lower surface 320 is low. It may be identified that the surface roughness of the first side portion 331 to the fifth side portion 335 of the side surface 330 linearly (gradually) vary (decrease) from the first side portion 331 to the fifth side portion 335. The value for the roughness is described below with reference to FIG. 10.

Figure 9:
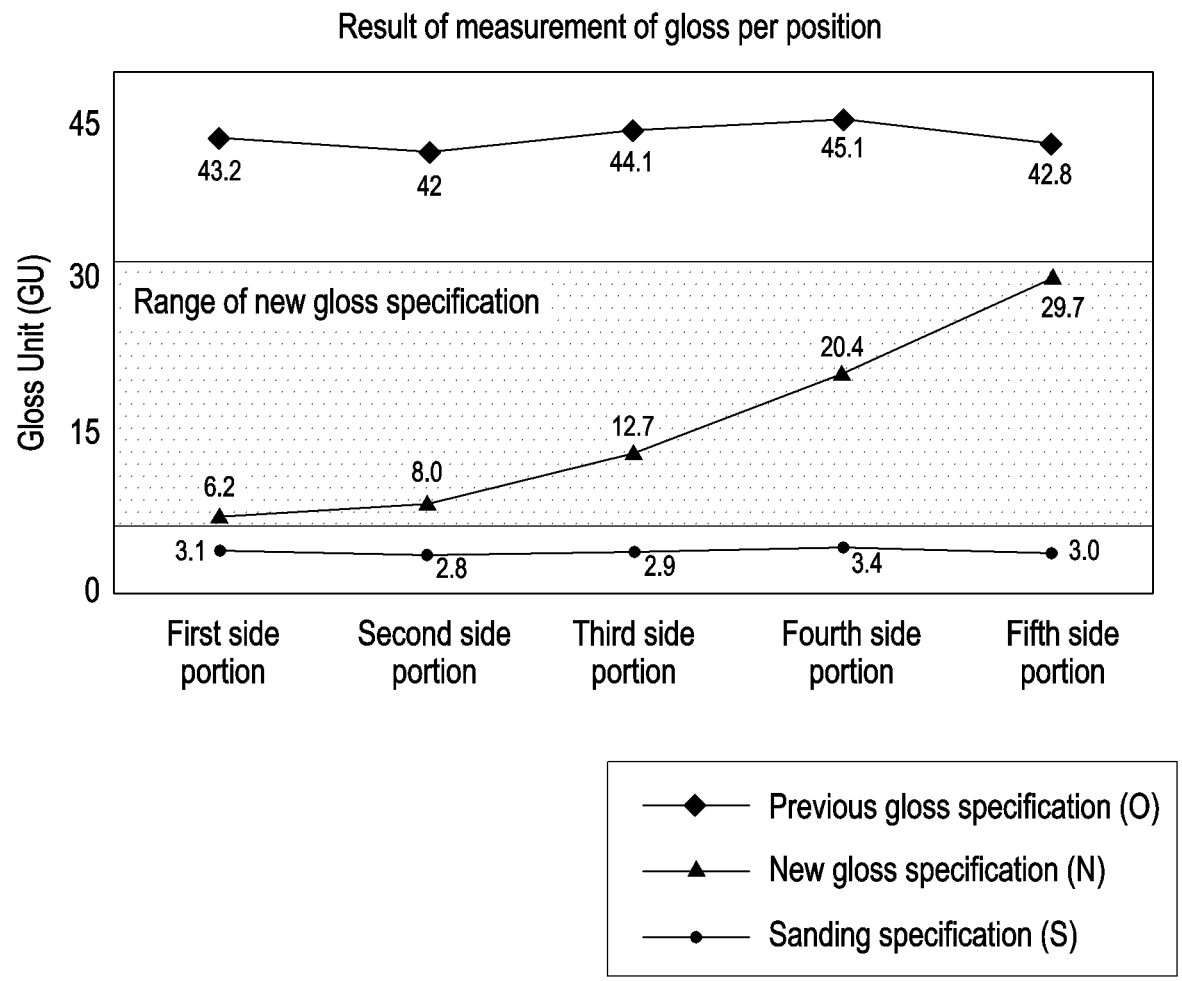
FIG. 9 is a graph illustrating the degree of gloss of a side surface according to an embodiment.

FIG. 9 is a graph illustrating the degree of gloss of a side surface according to an embodiment.

The first side portion 331 to the fifth side portion 335 referred to in FIG. 9 may be the same as or similar to the first side portion 331 to the fifth side portion 335 shown in FIGS. 6 to 8. Accordingly, duplicative description thereof is omitted below.

In the graph shown in FIG. 9, the X axis may denote the first side portion 331 to the fifth side portion 335, and the Y axis may denote the degree of gloss (gloss unit (GU)) of a surface or a sanded surface.

Referring to FIG. 9, according to an embodiment, the line of sanding specification S may show the degree of gloss after sanding, the line of previous gloss specification O may show the degree of gloss of a uniformly glossed surface, and the line of new gloss specification N may show the degree of gloss of the surface of certain embodiments of the disclosure.

According to an embodiment, the sanding specification S results in about 3.0 GU to about 3.4 GU in the first side portion 331 to the fifth side portion 335. After sanding, the surface is rough. Thus, the degree of gloss (GU) may be low due to light diffusion and reflection.

According to an embodiment, the previous gloss specification O results in about 42.0 GU to about 45.1 GU in the first side portion 331 to the fifth side portion 335. It may be seen that the deviation is about 3.1 GU and that the overall degree of gloss (GU) is high. In the previous gloss specification O, the first side portion 331 to the fifth side portion 335 have substantially the same degree of gloss.

According to an embodiment, the new gloss specification N results in about 6.2 GU to about 29.7 GU in the first side portion 331 to the fifth side portion 335. According to an embodiment, the new gloss specification N may result in about 6.2 GU in the first side portion 331, about 8.0 GU in the second side portion 332, about 12.7 GU in the third side portion 333, about 20.4 GU in the fourth side portion 334, and about 29.7 GU in the fifth side portion 335. It may be seen that the value of the new gloss specification N linearly varies (increases) as progressing from the first side portion 331 to the fifth side portion 335.

According to an embodiment, it may be identified that the deviation of the gloss in the new gloss specification N is about 23.5 GU and the deviation of the degree of gloss (GU) is large as compared with the previous gloss specification O. It may be identified that the new gloss specification N has a higher degree of gloss than the sanding specification S. As such, if the new gloss specification N applies, various different gloss specifications may be expressed on the side surface 330. Various gloss specifications expressed on the side surface 330 may be aesthetically pleasing to the user.

According to an embodiment, the new gloss specification N may be applied to various portions of the electronic device (e.g., the electronic device 200 of FIG. 2), rather than applied only to the side surface 330. For example, the new gloss specification N may also be applied to the upper surface (e.g., the upper surface 310 of FIG. 6), the lower surface (e.g., the lower surface 320 of FIG. 6), and/or the rear plate (e.g., the rear plate 280 of FIG. 5).

Figure 10:
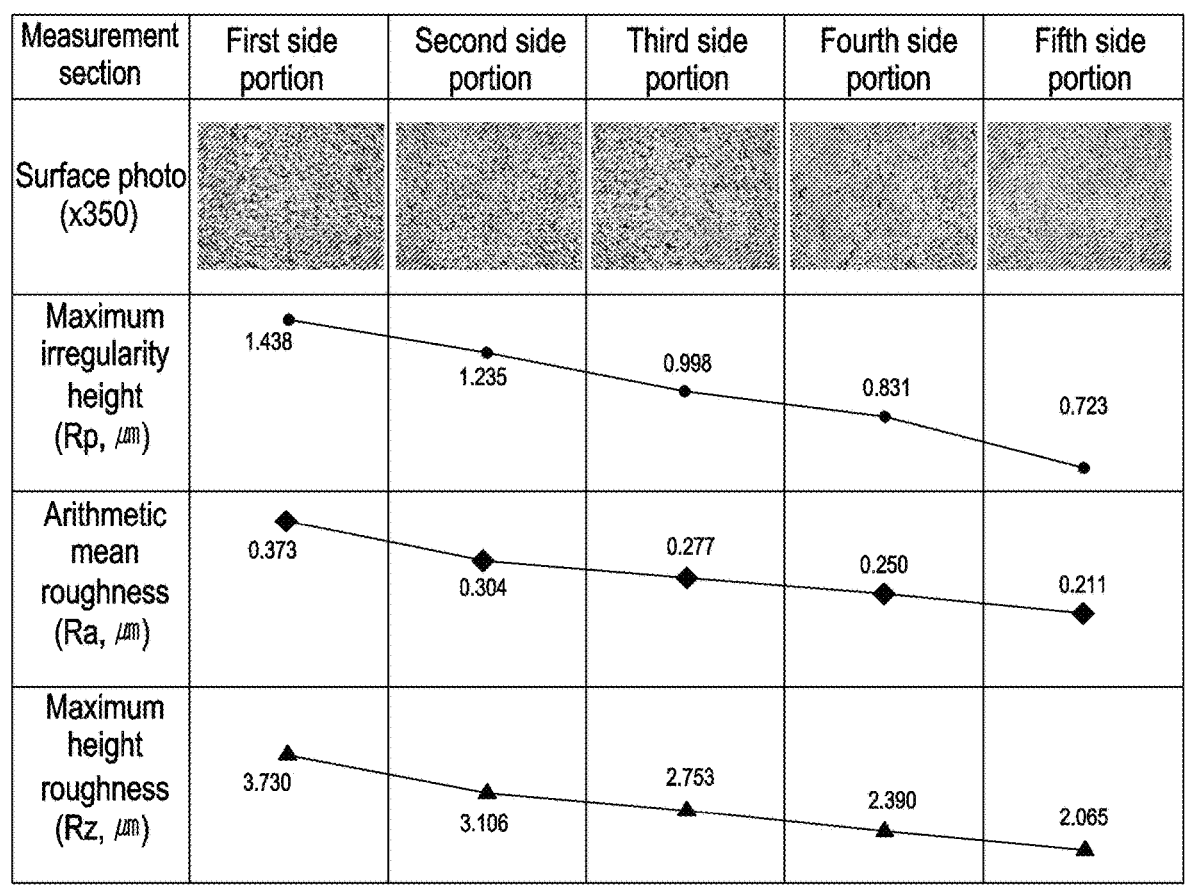
FIG. 10 illustrates surface photos and graphs for roughness of a side surface according to an embodiment.

FIG. 10 illustrates surface photos and graphs for roughness of a side surface according to an embodiment.

The first side portion 331 to the fifth side portion 335 illustrated in FIG. 10 may be the same as or similar to the first side portion 331 to the fifth side portion 335 illustrated in FIGS. 6 to 9. Accordingly, duplicative description thereof is omitted below.

Referring to FIG. 10, according to an embodiment, the surface photos, maximum irregularity height Rp, arithmetic mean roughness Ra, and maximum height roughness Rz of the first side portion 331 to the fifth side portion 335 may be identified. The unit of the maximum irregularity height Rp, the arithmetic mean roughness Ra, and the maximum height roughness Rz is micrometer (μm).

According to an embodiment, referring to the surface photos, it may be identified that the surface of the first side portion 331 is rough and coarse. It may be identified that the maximum irregularity height Rp of the first side portion 331 is about 1.438 μm, the arithmetic mean roughness Ra is about 0.373 μm, and the maximum height roughness Rz is about 3.730 μm.

According to an embodiment, referring to the surface photos, it may be identified that the surface of the second side portion 332 is less rough and coarse than the surface of the first side portion 331. It may be identified that the maximum irregularity height Rp of the second side portion 332 is about 1.235 μm, the arithmetic mean roughness Ra is about 0.304 μm, and the maximum height roughness Rz is about 3.106 μm.

According to an embodiment, referring to the surface photos, it may be identified that the surface of the third side portion 333 is less rough and coarse than the surface of the second side portion 332. It may be identified that the maximum irregularity height Rp of the third side portion 333 is about 0.998 μm, the arithmetic mean roughness Ra is about 0.277 μm, and the maximum height roughness Rz is about 2.753 μm.

According to an embodiment, referring to the surface photos, it may be identified that the surface of the fourth side portion 334 is less rough and coarse than the surface of the third side portion 333. It may be identified that the maximum irregularity height Rp of the fourth side portion 334 is about 0.831 μm, the arithmetic mean roughness Ra is about 0.250 μm, and the maximum height roughness Rz is about 2.390 μm.

According to an embodiment, referring to the surface photos, it may be identified that the surface of the fifth side portion 335 is less rough and coarse than the surface of the fourth side portion 334. It may be identified that the maximum irregularity height Rp of the fifth side portion 335 is about 0.723 µm, the arithmetic mean roughness Ra is about 0.211 µm, and the maximum height roughness Rz is about 2.065 µm.

Referring to FIG. 10, according to an embodiment, it may be identified that the surface roughness, particle size, maximum irregularity height Rp, arithmetic mean roughness Ra, and maximum height roughness Rz decrease from the first side portion 331 to the fifth side portion 335. Accordingly, it may be identified that in various portions of one side surface (e.g., the side surface 330 of FIG. 8), the surface roughness, particle size, maximum irregularity height Rp, arithmetic mean roughness Ra, and maximum height roughness Rz are of various values.

According to another embodiment, the surface roughness, particle size, maximum irregularity height Rp, arithmetic mean roughness Ra, and maximum height roughness Rz increase from the first side portion 331 to the fifth side portion 335. Various surface roughnesses, particle sizes, maximum irregularity heights Rp, arithmetic mean roughnesses Ra, and maximum height roughnesses Rz may be embodied by not only the side surface 330 but also by the upper surface 310, lower surface 320, and/or rear plate 280.

Figure 11:
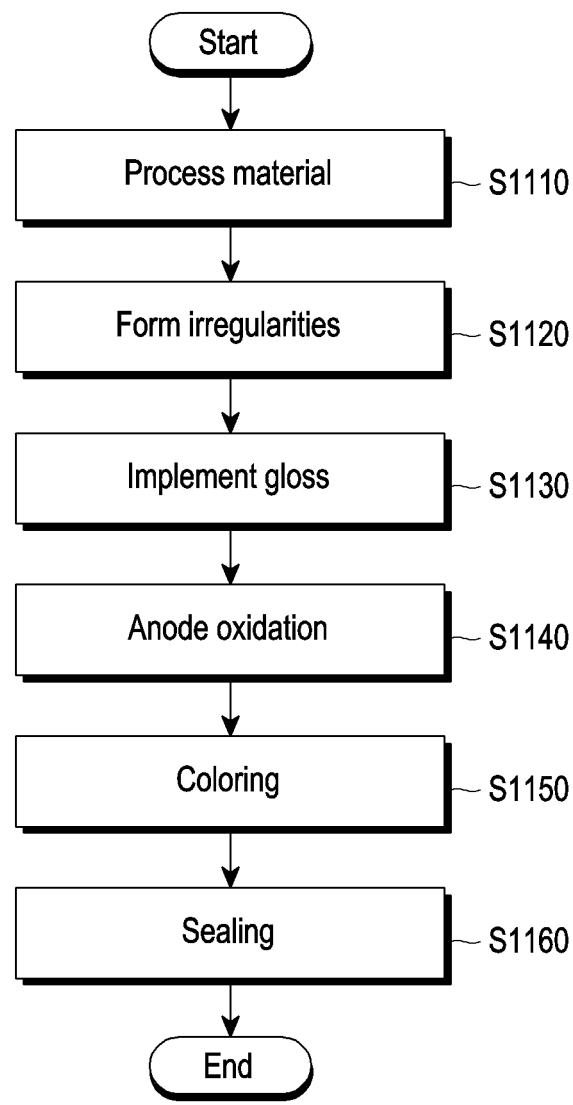
FIG. 11 is a flowchart illustrating a surface treatment process according to an embodiment.

FIG. 11 is a flowchart illustrating a surface treatment process according to an embodiment.

The upper surface 310, lower surface 320, side surface 330, and/or rear plate 280 illustrated in FIGS. 7A to 10 may undergo surface treatment according to the process illustrated in FIG. 11.

According to an embodiment, the process S1110 of processing a material to implement a product in a designed shape may be performed. The process may include casting, pressing, and/or cutting.

According to an embodiment, the process S1120 of forming irregularities on the surface of the processed material may be performed. The process of forming the irregularities on the surface of the material may include various processes. According to an embodiment, irregularities may be formed by jetting particles, such as sand and/or ceramic, to the surface of the material. In the process of forming the irregularities, the gloss of the surface of the material may be reduced or removed.

According to an embodiment, the process S1130 of implementing gloss on the surface of the material with the irregularities may be performed. This process may include immersing the material in a solution and etching the protrusions of the irregularities formed on the surface of the material. As the protrusions of the irregularities formed on the surface of the material are etched, the surface of the material may be flattened, so that the surface may be made to be glossy. In the process of immersing the material in the solution and etching the protrusions of the irregularities, the amount of the irregularities etched may be varied depending on the concentration of the solution, the temperature of the solution, and/or the immersion time. According to an embodiment, as the concentration of the solution, the temperature of the solution, or the immersion time increases, the amount of the irregularities etched may increase. Conversely, as the concentration of the solution, the temperature of the solution, or the immersion time decreases, the amount of the irregularities etched may decrease. The solution used for etching the irregularities may be an acidic solution.

In the process S1130 of etching the protrusions of the irregularities to implement gloss, the immersion time is described below with reference to FIG. 12, the temperature of the solution is described below with reference to FIG. 13, and the concentration of the solution is described below with reference to FIG. 14.

According to an embodiment, the process S1140 of performing anode oxidation on the glossed material may be performed. The anode oxidation is a metal surface treatment and may be referred to as an anodizing process. By immersing the metal material in an electrolyte solvent, such as sulfuric acid, oxalic acid, and/or chromic acid, an oxide film may be formed on the surface of the material. The anode oxidation may use a voltage of about 5V to about 50V, take about 10 minutes to about 3 hours, and be performed at about 5° C. to about 30° C.

According to an embodiment, a coloring process S1150 for implementing color on the anode-oxidized material may be performed. The coloring process may include an immersion method and/or an electrolytic coloring method. In the immersion method, the product may be immersed in dye to be diffused and adsorbed, and in the electrolytic coloring method, an electric current may be applied to a metal salt electrolyte. In the immersion method, the concentration of the coloring solution may be about 1 g/L to about 10 g/L, the required time may be about 1 minute to about 10 minutes, and the temperature may be about 30° C. to about 60° C.

According to an embodiment, the process S1160 of sealing the colored material may be performed. The sealing process may provide anti-corrosion.

Figure 12:
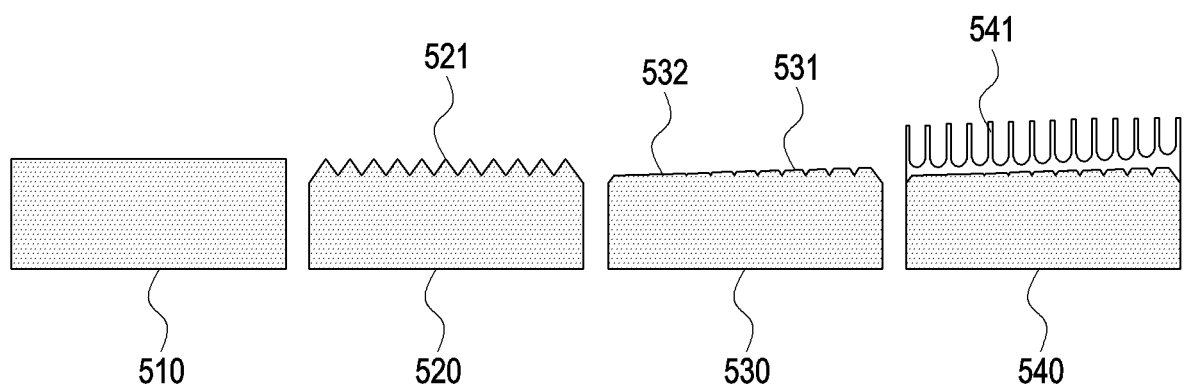
FIG. 12 is a view schematically illustrating processing of a material according to an embodiment.

FIG. 12 is a view illustrating processing of a material, according to an embodiment.

The process in FIG. 12 may be the same as or similar to the process described in connection with FIG. 11. Accordingly, duplicative description thereof is omitted below.

According to an embodiment, the material 510 may be processed into a material 520 with irregularities through a treating process (e.g., the material processing S1110 of FIG. 11) or irregularity forming process (e.g., the irregularity formation S1120 of FIG. 11). Irregularities 521 may be formed on the surface of the irregularity-formed material 520. The irregularities 521 may come in various shapes and, according to an embodiment, the irregularities 521 may have triangular shapes.

According to an embodiment, the irregularity-formed material 520 may be processed into an etched material 530 in which at least part of the irregularities 521 is etched out through a gloss implementing process (e.g., the gloss implementation S1130 of FIG. 11). The surface of the irregularity-formed material 520 may be etched evenly or unevenly. According to an embodiment, the irregularities 521 may be etched more at one end of the etched material 530 and less at the opposite end of the etched material 530. The part where the irregularities 521 are etched more may have a higher degree of gloss, and the part where the irregularities 521 are etched less may have a lower degree of gloss. The maximum height of the irregularities 521 at the part etched more may be lower than the maximum height of the irregularities 521 at the part etched less. For example, a first irregularity 531 that was etched less may be larger in maximum height than a second irregularity 532 that was etched more. The degree of gloss of the first irregularity 531 may be lower than the degree of gloss of the second irregularity 532. The etching amount of the irregularities is varied depending on the temperature of the etching solution, concentration, and/or etching time, which is described below with reference to FIGS. 13 to 15.

According to an embodiment, the etched material 530 may be processed into a material 540 having a film deposited through an anode oxidation process (e.g., the anode oxidation S1140 of FIG. 11). According to an embodiment, an oxide film 541 may be formed on the etched material 530 so that the material 530 may be processed into a film-formed material 540. As the oxide film 541 is formed, the durability of the product may be enhanced.

Figure 13:
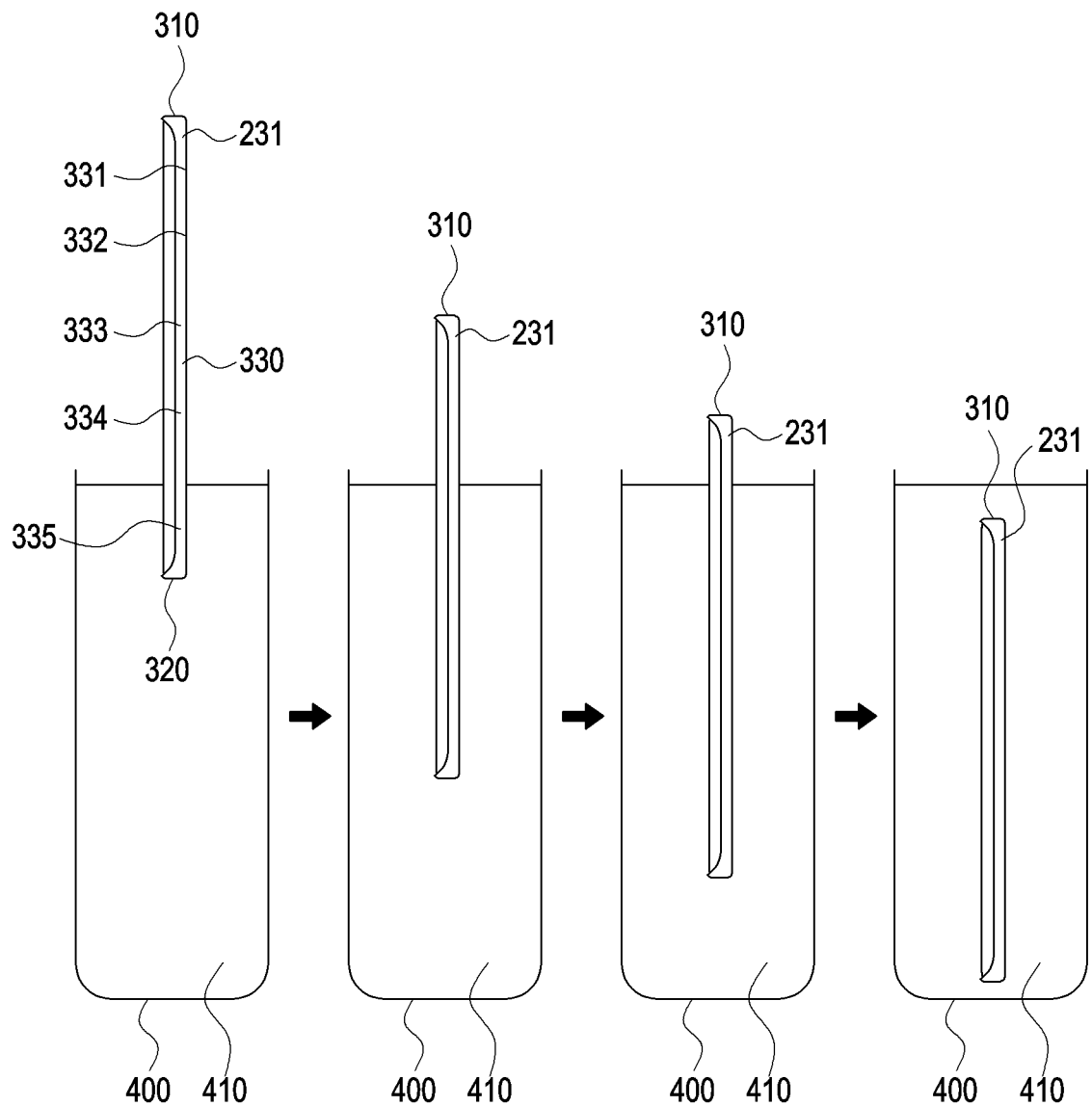
FIG. 13 is a view illustrating a process of implementing gloss according to etching time according to an embodiment.
Figure 14:
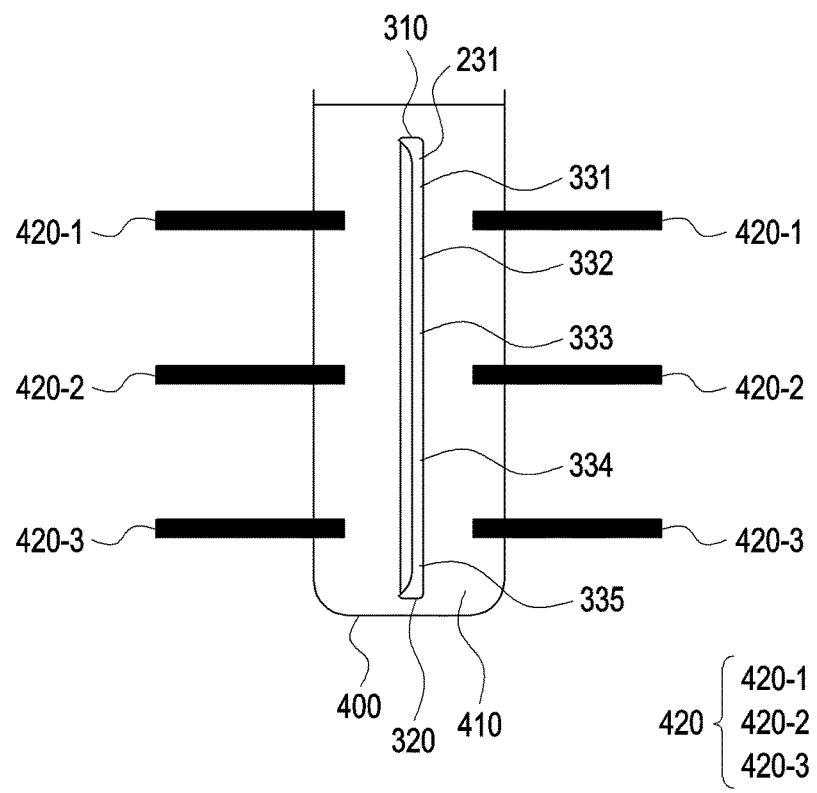
FIG. 14 is a view illustrating a process of implementing gloss according to the temperature of an etching solution according to an embodiment.
Figure 15:
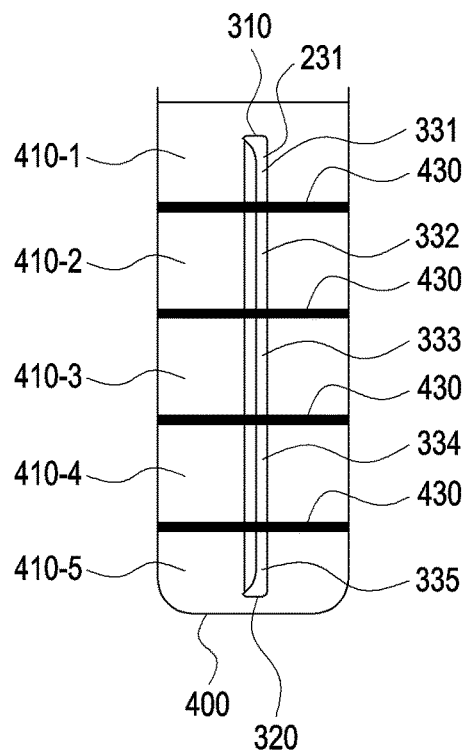
FIG. 15 is a view illustrating a process of implementing gloss according to the concentration of an etching solution according to an embodiment.

FIGS. 13 to 15 illustrate certain embodiments of a gloss implementing process. An etching vessel 400 illustrated in FIGS. 13 to 15 is a container for the etching solution 410. The etching solution 410 may be a solution for etching at least a portion of the side bezel structure (e.g., the side bezel structure 231 of FIG. 5) and/or the rear plate (e.g., the rear plate 280 of FIG. 5).

According to certain embodiments, the etching solution 410 may be an acidic solution and may be a solution including sulfuric acid, hydrochloric acid, phosphoric acid, oxalic acid, and/or chromic acid. The concentration of the solution may be from about 20% to about 100%. The etching solution 410 may be used by mixing two different types of solutions. FIG. 13 illustrates a process of implementing gloss according to etching time according to an embodiment.

The side bezel structure 231, the upper surface 310, the lower surface 320, and the side surface 330 illustrated in FIG. 13 may be the same as or similar to the side bezel structures 231, the upper surface 310, the lower surface 320, and the side surface 330 illustrated in FIGS. 5 to 8. Accordingly, duplicative description thereof is omitted below.

Referring to FIG. 13, according to an embodiment, the etching solution 410 may be received in the etching vessel 400. At least a portion of the side bezel structure 231 may be immersed in the etching vessel 400 in which the etching solution 410 is received.

According to an embodiment, the side bezel structure 231 may be gradually lowered into the etching vessel 400 over time. According to an embodiment, the side bezel structure 231 may be moved to be closer to the etching vessel 400. According to another embodiment, the etching vessel 400 may be moved to be closer to the side bezel structure 231.

According to an embodiment, as the etching vessel 400 and the side bezel structure 231 come closer to each other, the lower surface 320 of the side bezel structure 231 may contact the etching solution 410. As the lower surface 320 comes into contact with the etching solution 410 first, the lower surface 320 may be etched before the upper surface 310, and the etching time of the lower surface 320 may be longer than the etching time of the upper surface 310. Accordingly, the etching time of the lower surface 320 may be the longest, and the etching time may be reduced in the order of the fifth side portion 335, the fourth side portion 334, the third side portion 333, the second side portion 332, the first side portion 331, and the upper surface 310. As such, as the gloss implementing process (S1130 of FIG. 11) proceeds so that the etching time is different for each portion of the side bezel structure 231, the degree of gloss of the side bezel structure 231 may be different for each portion.

According to an embodiment, the gloss implementing process S1130 may be configured so that the upper surface 310 first comes into contact with the etching solution 410.

According to an embodiment, the gloss implementing process S1130 may be configured such that the side surface 330, at least a portion of the upper surface 310, and at least a portion of the lower surface 320 first comes in contact with the etching solution 410.

According to an embodiment, with the side bezel structure 231 received in the etching vessel 400, the etch solution 410 may be injected into the etching vessel 400 to perform the gloss implementing process (S1130).

According to an embodiment, the gloss implementing process S1130 may be performed on the rear plate 280 by the above-described method.

FIG. 14 illustrates a process of implementing gloss according to the temperature of an etching solution according to an embodiment.

The side bezel structure 231, the upper surface 310, the lower surface 320, and the side surface 330 illustrated in FIG. 14 may be the same as or similar to the side bezel structures 231, the upper surface 310, the lower surface 320, and the side surface 330 illustrated in FIGS. 5 to 8. Accordingly, duplicative description thereof is omitted below.

Referring to FIG. 14, the etching solution 410 may be received in the etching vessel 400. A temperature control device 420 may be disposed on at least a portion of the etching vessel 400. According to an embodiment, a plurality of temperature control devices 420 may be disposed to contact the etching solution 410. The plurality of temperature control devices 420 may be maintained at different temperatures, so that temperature differences may occur in the etching solution 410. According to an embodiment, the temperature control devices 420 may include a first temperature control device 420-1, a second temperature control device 420-2, and a third temperature control device 420-3.

According to an embodiment, the first temperature control device 420-1 may be disposed at an upper side of the etching vessel 400, the second temperature control device 420-2 may be disposed at the middle of the etching vessel 400, and the third temperature control device 420-3 may be disposed at a lower side of the etching vessel 400.

According to an embodiment, the first temperature control device 420-1 may be set to a low temperature, the second temperature control device 420-2 may be set to a higher temperature than the first temperature control device 420-1, and the third temperature control device 420-3 may be set to a higher temperature than the second temperature control device 420-2.

According to an embodiment, as the first temperature control device 420-1, the second temperature control device 420-2, and the third temperature control device 420-3 are set to different temperatures, the amount of etching by the etching solution 410 may be varied. For example, the etching amount by the third temperature control device 420-3 which is at a relatively high temperature may be large, and the etching amount by the first temperature control device 420-1 which is at a relatively low temperature may be small.

According to an embodiment, as the etching amount by the etching solution 410 varies depending on the temperature, the etching amount may vary for each portion of the side bezel structure 231. According to an embodiment, the etching amount of the lower surface 320 and the fifth side portion 335 adjacent to the third temperature control device 420-3 which is at a relatively high temperature may be large, so that the degree of gloss of the lower surface 320 and the fifth side portion 335 may be high. The etching amount of the upper surface 310 and the first side portion 331 adjacent to the first temperature control device 420-1 which is relatively at a low temperature may be small, so that the degree of gloss of the upper surface 310 and the first side portion 331 may be low. The etching amount of the third side portion 333 adjacent to the second temperature control device 420-2 which is relatively at a medium temperature may be medium, so that the degree of gloss of the third side portion 333 may be an intermediate value between the degree of gloss of the first side portion 331 and the degree of gloss of the fifth side portion 335. As such, as a temperature difference occurs in the etching solution 410, the degree of gloss may differ for each portion in the side bezel structure 231.

According to an embodiment, the first temperature control device 420-1 may be relatively at a high temperature, the second temperature control device 420-2 may be relatively at a medium temperature, and the third temperature control device 420-3 may be relatively at a low temperature. According to another embodiment, the second temperature control device 420-2 may be relatively at a high or low temperature. A barrier rib 430 illustrated in FIG. 15 may be disposed between the plurality of temperature control devices 420.

According to an embodiment, the gloss implementing process S1130 may be performed on the rear plate 280 by the above-described method.

FIG. 15 illustrates a process of implementing gloss according to the concentration of an etching solution according to an embodiment.

The side bezel structure 231, the upper surface 310, the lower surface 320, and the side surface 330 illustrated in FIG. 15 may be the same as or similar to the side bezel structures 231, the upper surface 310, the lower surface 320, and the side surface 330 illustrated in FIGS. 5 to 8. Accordingly, duplicative description thereof is omitted below.

Referring to FIG. 15, according to an embodiment, the etching solution 410 may be received in the etching vessel 400. A barrier rib 430 may be disposed in the etching vessel 400. The side bezel structure 231 may pass through the barrier rib 430, and the barrier rib 430 may prevent mixing of the etching solution 410.

According to an embodiment, the etching solution 410 may be spaced apart by a plurality of barrier ribs 430. For example, the etching solution 410 may be provided as a first etching solution 410-1, a second etching solution 410-2, a third etching solution 410-3, a fourth etching solution 410-4, and a fifth etching solution 410-5. The first etching solution 410-1 to the fifth etching solution 410-5 may be provided at different concentrations. For example, the concentration of the fifth etching solution 410-5 may be the highest, and the concentration may be reduced in the order of the fourth etching solution 410-4, the third etching solution 410-3, the second etching solution 410-2, and the first etching solution 410-1.

According to an embodiment, as the concentration of the etching solution 410 increases, the etching amount may increase, and if the concentration of the etching solution 410 decreases, the etching amount may be reduced. As the concentrations of the first etching solution 410-1 to the fifth etching solution 410-5 are different, the etching amount may differ for each portion of the side bezel structure 231. According to an embodiment, the etching amount of the lower surface 320 and the fifth side portion 335 adjacent to the fifth etching solution 410-5 may be the largest, and the etching amount of the upper surface 310 and the first side portion 331 adjacent to the first etching solution 410-1 may be the smallest. The etching amount of the third side portion 333 adjacent to the third etching solution 410-3 may be an intermediate value between the etching amount of the first side portion 331 and the etching amount of the fifth side portion 335.

According to an embodiment, a barrier rib 430 may be disposed in the inner space of the etching vessel 400. The barrier rib 430 may prevent the first etching solution 410-1 to the fifth etching solution 410-5 from being mixed.

According to another embodiment, the concentrations of the first etching solution 410-1 to the fifth etching solution 410-5 may be configured irregularly. For example, the concentration of the third etching solution 410-3 may be the highest or the lowest.

According to another embodiment, the gloss implementing process S1130 may be performed on the rear plate 280 by the above-described method.

According to an embodiment of the disclosure, a housing of an electronic device may comprise a first surface (e.g., the side surface 330 of FIG. 6) including a first portion (e.g., the first side portion 331 of FIG. 6) having an irregularity formed thereon and a second portion (e.g., the fifth side portion 335 of FIG. 6) spaced apart from the first portion and having an irregularity formed thereon. The irregularity formed on the first surface may be formed by etching. A maximum height of the irregularity formed on the first portion may be different from a maximum height of the irregularity formed on the second portion. The maximum height of irregularities formed on the first surface may gradually increase or decrease from the first portion to the second portion.

According to an embodiment, the maximum height of the irregularity formed on the first surface may be linearly varied.

According to an embodiment, the maximum height of the irregularity formed on the first portion may be larger than the maximum height of the irregularity formed on the second portion.

According to an embodiment, a degree of gloss of the first portion may differ from a degree of gloss of the second portion.

According to an embodiment, a roughness of the first portion may differ from a roughness of the second portion.

According to an embodiment, the housing may further comprise a second surface (e.g., the upper surface 310 of FIG. 6) and a third surface (e.g., the lower surface 320 of FIG. 6), respectively, disposed on two opposite lengthwise ends of the first surface.

According to an embodiment, a maximum height of an irregularity formed on the second surface and a maximum height of an irregularity formed on the third surface may differ from each other.

According to an embodiment, an oxide film (e.g., the oxide film 541 of FIG. 12) may be formed on the first surface.

According to an embodiment, a color may be implemented on the first surface.

According to an embodiment, the first surface may be sealed.

According to an embodiment of the disclosure, a method for manufacturing a housing of an electronic device may comprise forming (e.g., the irregularity forming process S1120 of FIG. 11) irregularities on a first portion (the first side portion 331 of FIG. 6) and a second portion (e.g., the fifth side portion 335 of FIG. 6) of a first surface (e.g., the side surface 330 of FIG. 6) and etching (e.g., the gloss implementing process S1130 of FIG. 11) the irregularities formed on the first portion and the second portion using an etching solution (e.g., the etching solution 410 of FIG. 13) so that the irregularities have different maximum heights. The maximum height of the irregularities formed on the first surface may gradually increase or decrease from the first portion to the second portion.

According to an embodiment, the maximum height of the irregularities formed on the first surface may be linearly varied.

According to an embodiment, the maximum height of the irregularities formed on the first portion may be larger than the maximum height of the irregularities formed on the second portion.

According to an embodiment, a degree of gloss of the first portion may differ from a degree of gloss of the second portion.

According to an embodiment, a roughness of the first portion may differ from a roughness of the second portion.

According to an embodiment, a time period during which the first portion contacts the etching solution may differ from a time period during which the second portion contacts the etching solution.

According to an embodiment, a temperature of the etching solution adjacent to the first portion may differ from a temperature of the etching solution adjacent to the second portion.

According to an embodiment, a concentration of the etching solution adjacent to the first portion may differ from a concentration of the etching solution adjacent to the second portion.

According to an embodiment, the method may further comprise forming (e.g., the anode oxidation S1140 of FIG. 11) an oxide film (e.g., the oxide film 541 of FIG. 12) on the first surface.

According to an embodiment, the method may further comprise implementing (e.g., the sealing S1160 of FIG. 11) a color on the first surface.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. A housing of an electronic device, comprising a side bezel structure comprising an upper surface, a lower surface, and a side surface disposed between the upper surface and the lower surface,
   wherein the side surface including:
   a first portion which is a portion of the side surface closest to the upper surface and having an irregularity formed thereon; and
   a second portion which is a portion of the side surface closest to the lower surface, spaced apart from the first portion and having an irregularity formed thereon,
   wherein the irregularities formed on the side surface are processed by etching,
   wherein a maximum height of the irregularity formed on the first portion is different from a maximum height of the irregularity formed on the second portion,
   wherein a degree of gloss of the second portion is at least three times a degree of gloss of the first portion, and
   wherein a maximum height of irregularities formed on the side surface gradually increases or decreases from the first portion to the second portion.

2. The housing of claim 1, wherein the maximum height of the irregularities formed on the side surface is linearly varied.

3. The housing of claim 1, wherein the maximum height of the irregularity formed on the first portion is larger than the maximum height of the irregularity formed on the second portion.

4. The housing of claim 1, wherein a roughness of the first portion differs from a roughness of the second portion.

5. The housing of claim 1, further comprising a second surface and a third surface, respectively, disposed on two opposite lengthwise ends of the side surface.

6. The housing of claim 5, wherein a maximum height of an irregularity formed on a second surface and a maximum height of an irregularity formed on a third surface differ from each other.

7. The housing of claim 1, wherein an oxide film is formed on the side surface.

8. The housing of claim 1, wherein a color is implemented on the side surface.

9. The housing of claim 1, wherein the side surface is sealed.

10. A method for manufacturing a housing of an electronic device, the method comprising:
    forming irregularities on a first portion and a second portion of a side surface; and
    etching the irregularities formed on the first portion and the second portion using an etching solution so that the irregularities have different maximum heights,
    wherein the housing comprising a side bezel structure comprising an upper surface, a lower surface, and a side surface disposed between the upper surface and the lower surface,
    wherein the first portion is a portion of the side surface closest to the upper surface and the second portion is a portion of the side surface closest to the lower surface,
    wherein a maximum height of the irregularities formed on the side surface gradually increases or decreases from the first portion to the second portion, and
    wherein a degree of gloss of the second portion is at least three times a degree of gloss of the first portion.

11. The method of claim 10, wherein the maximum height of the irregularities formed on the side surface is linearly varied.

12. The method of claim 10, wherein the maximum height of the irregularities formed on the first portion is larger than the maximum height of the irregularities formed on the second portion.

13. The method of claim 10, wherein a roughness of the first portion differs from a roughness of the second portion.

14. The method of claim 10, wherein a time period during which the first portion contacts the etching solution differs from a time period during which the second portion contacts the etching solution.

15. The method of claim 10, wherein a temperature of the etching solution adjacent to the first portion differs from a temperature of the etching solution adjacent to the second portion.

16. The method of claim 10, wherein a concentration of the etching solution adjacent to the first portion differs from a concentration of the etching solution adjacent to the second portion.

17. The method of claim 10, further comprising forming an oxide film on the side surface.

18. The method of claim 10, further comprising implementing a color on the side surface.

19. The method of claim 10, wherein the irregularity formed on the first portion and the second portion is formed by etching at different temperatures simultaneously.

* * * * *